(12) United States Patent
Wang et al.

(10) Patent No.: US 8,248,661 B2
(45) Date of Patent: Aug. 21, 2012

(54) COLOR-CONSISTENT THREE LEVEL DIFFERENTIAL GLOSS IMAGES

(75) Inventors: Shen-Ge Wang, Fairport, NY (US);
Reiner Eschbach, Webster, NY (US);
William A. Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1368 days.

(21) Appl. No.: 11/705,249

(22) Filed: Feb. 12, 2007

(65) Prior Publication Data
US 2008/0192297 A1    Aug. 14, 2008

(51) Int. Cl.
*G06K 15/00* (2006.01)
*H04N 1/40* (2006.01)

(52) U.S. Cl. ............... 358/3.06; 358/3.08; 358/3.09; 358/3.1; 358/3.2; 358/1.9; 358/3.28; 358/3.3; 358/534; 358/535; 358/536; 382/212; 382/237; 382/270; 283/902; 283/91; 283/92; 283/93; 283/113; 283/114

(58) Field of Classification Search .............. 358/3.06, 358/3.08–3.2, 1.9, 2.1, 1.11, 1.2, 3.17, 3.28, 358/3.3, 534–536; 283/902, 91, 92, 93, 113, 283/114; 382/212, 237, 270
See application file for complete search history.

(56) References Cited

U.S. PATENT DOCUMENTS

| | | | |
|---|---|---|---|
| 3,784,289 A | 1/1974 | Wicker | |
| 5,734,752 A | 3/1998 | Knox | |
| 6,606,168 B1 | 8/2003 | Rylander | |
| 6,714,320 B1 | 3/2004 | Namahara et al. | |
| 6,906,825 B1 | 6/2005 | Nakahara et al. | |
| 7,092,128 B2 | 8/2006 | Wang et al. | |
| 7,126,721 B2 | 10/2006 | Wang et al. | |
| 7,148,999 B2 | 12/2006 | Xu et al. | |
| 2003/0231349 A1* | 12/2003 | Wang et al. | 358/3.06 |
| 2004/0000786 A1* | 1/2004 | Xu et al. | 283/113 |
| 2004/0001233 A1* | 1/2004 | Wang et al. | 358/3.06 |
| 2004/0101158 A1 | 5/2004 | Butler | |
| 2004/0101159 A1 | 5/2004 | Butler | |
| 2004/0103055 A1 | 5/2004 | Butler | |
| 2004/0114160 A1 | 6/2004 | Wang et al. | |
| 2004/0156078 A1 | 8/2004 | Wang et al. | |
| 2005/0128523 A1* | 6/2005 | Liu et al. | 358/3.06 |
| 2005/0128524 A1 | 6/2005 | Liu et al. | |
| 2005/0286083 A1 | 12/2005 | Wang et al. | |
| 2006/0044617 A1 | 3/2006 | Wang et al. | |
| 2006/0072159 A1 | 4/2006 | Eschbach et al. | |
| 2006/0127117 A1 | 6/2006 | Eschbach et al. | |

FOREIGN PATENT DOCUMENTS

EP      1 377 028 A1    1/2004
GB      2040224 A       8/1980

OTHER PUBLICATIONS

European Search Report, Application No. Ep 08101361.7, mailed Oct. 5, 2009, European Patent Office.

\* cited by examiner

*Primary Examiner* — Steven Kau

(74) *Attorney, Agent, or Firm* — Fay Sharpe LLP

(57) ABSTRACT

A method for creating a differential gloss image includes providing first and second anisotropic halftone structures. The first and second anisotropic structures have different orientations. One of the first and second anisotropic structures is applied to image data in a first region of an image to be halftoned. The other of the first and second anisotropic structures may be applied to image data in a second region of an image to be halftoned. A mixture of the first and second anisotropic structures is applied to image data in a third region of the image to be halftoned, whereby when printed, the three regions each have a gloss characteristic which differs from that of the other two regions.

21 Claims, 8 Drawing Sheets

| 16 | 15 | 11 | 8 | 4 | 3 |
| --- | --- | --- | --- | --- | --- |
| 12 | 18 | 13 | 6 | 1 | 7 |
| 10 | 14 | 17 | 2 | 5 | 9 |
| 3 | 4 | 8 | 11 | 15 | 16 |
| 7 | 1 | 6 | 13 | 18 | 12 |
| 9 | 5 | 2 | 17 | 14 | 10 |

FIG. 6

COLOR-CONSISTENT THREE LEVEL DIFFERENTIAL GLOSS IMAGES

BACKGROUND

The exemplary embodiment relates generally to the gloss inherent in the hardcopy of image data, be it pictorial or text. More particularly, it relates to halftoned image data and the control of differential gloss when that halftone image data is printed into hardcopy.

Digital watermarks have been applied to images for a variety of purposes, including verification of authenticity of documents, providing information, and prevention of copying. Many of the techniques for generating such watermarks involve adding image data or modifying image data in an existing image prior to printing the image. In other techniques, selective application of a clear toner to a rendered image is used to create a watermark.

More recently, Glossmark™ technology based on differential gloss has been used for the generation of digital watermarks. The technology allows a digital watermark to be introduced without modification of the original image content or use of special marking materials or substrates. Rather, the technique creates a differential gloss, image which can be discerned by a human reader holding the printed paper at an angle but which cannot be detected by a scanner or copier during normal scanning. These devices are restricted to reading the image at a fixed angle to the paper, which is generally selected so as to minimize the impact of specular reflection. The differential gloss image is created by selective use of two different halftone screens which create two different gloss characteristics in halftone outputs.

In halftone printing, a contone image (an image in which gray levels are-substantially continuously variable) is converted to a binary image before printing. At a specified location, or pixel, a spot is either printed or not printed, which is controlled by halftone techniques. The most common halftoning method is screening, in which a halftone screen determines how a cluster of pixels grows with increasing gray level. Here, gray level refers to increasing intensity for any channel, irrespective of whether it is a monochrome or a color channel. The halftone screen compares the required continuous tone levels with predetermined threshold levels typically defined for a rectangular cell that is tiled to fill the image plane. The output of the screening process is a binary pattern of multiple small "dots," which are regularly spaced in a grid as is determined by the size, shape, and tiling of the halftone screen. In conventional screening process, the dots grow generally radially outward as gray level increases to form circular-shaped clusters. In current Glossmark™ technology, two halftone screens having different anisotropic structure orientations are used. The anisotropic structure may be provided by the growth pattern and/or orientation of the screen. By toggling between the two halftone screens in generating the halftone image, differences in gloss are apparent when the rendered image is viewed at an angle.

Although there are many different screen combinations which provide desired gloss difference for the differential gloss effect, matching the color or density appearances of two different halftone structures usually requires two separate color calibrations for two screens. Without color calibration, the halftone outputs corresponding to the two halftone screens may well be distinguishable not only in their gloss difference but also in their color and/or density. Even with such color calibrations, machine defects, such as banding, miss-registration, or distortion, may cause color miss-match for two different halftones from time to time or from place to place. To minimize these effects, two halftone structures which are mirror images of each other may be selected. This generally avoids the need for two separate color calibrations, but also provides a robust solution for creating Glossmark™ images which will be apparent only in their gloss difference, and not in color and/or density. As a consequence, differential gloss images which provide consistent color and density have, to date, been formed with only two distinguishable gloss levels.

INCORPORATION BY REFERENCE

Cross reference is made to the following patents and applications, the disclosures of which are incorporated by reference herein in their entireties:

U.S. Pat. No. 5,734,752, issued Mar. 31, 1998, by Knox, discloses a method for generating watermarks in a digitally reproducible document which are substantially invisible when viewed. The method includes producing a first stochastic screen pattern suitable for reproducing a gray image on a document, deriving at least one stochastic screen description that is related to the first pattern, producing a document containing the first stochastic screen, producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

U.S. Pat. No. 7,092,128, issued Aug. 15, 2006, (U.S. Pub. No. 20040156078), entitled APPLICATION OF GLOSSMARKS FOR GRAPHICS ENHANCEMENT, by Shen-Ge Wang, et al., relates to a method for providing a designer with the tools for the manipulation of differential gloss in halftoned images. A special mask layer is provided for the rendering of desired Glossmark image data. The desired Glossmark image data is used to select between two halftones with anisotropic structure characteristics which are significantly different in orientation while remaining identical in density. This selection is made for each corresponding portion of primary image data. In this way, a halftone image of the primary image is generated with Glossmarks embedded therein which will display differential gloss without the need for special toners or paper.

U.S. Pat. No. 7,126,721, issued Oct. 24, 2006, (U.S. Pub. No. 20040001233), entitled PROTECTING PRINTED ITEMS INTENDED FOR PUBLIC EXCHANGE WITH GLOSSMARKS, by Shen-Ge Wang, et al., relates to the protection of printed items intended for public exchange having important informational indicia provided therein. The print items are protected from tampering by providing an informational indicia image as a Glossmark. By selectively applying halftones with anisotropic structure characteristics which are significantly different in orientation while remaining identical in density to render information indicia, a Glossmark™ image is produced of the information indicia. Such an information indicia Glossmark™ image when provided in print item image helps protect that print item image from tampering.

U.S. Pat. No. 7,148,999, issued Dec. 12, 2006 (Pub. No. 20040000786), entitled VARIABLE GLOSSMARK, by Beilei Xu, et al. relates to the segmentation of an image into a main area and an image segment for variable Glossmark data. By selectively applying halftones with anisotropic structure characteristics which are significantly different in orientation while remaining identical in density to the image segment, a variable Glossmark may be superimposed within an image with reduced processing and storage requirements.

U.S. Pub. No. 20030231349, published Dec. 18, 2003, entitled HALFTONE IMAGE GLOSS CONTROL FOR GLOSSMARKS, by Shen-Ge Wang, et al. relates to the manipulation of differential gloss as may be inherent in halftoned images. By selectively applying halftones with anisotropic structure characteristics which are significantly different in orientation while remaining identical in density, a gloss image may be superimposed within an image without the need for special toners or paper.

U.S. Pub. No. 20040114160, published Jun. 17, 2004, entitled TAG CONTROL FOR RUNTIME GLOSSMARKS, by Shen-Ge Wang, et al., relates to the manipulation of differential gloss as may be inherent in halftoned images by utilization of tags. A method for the manipulation of the differential gloss in a halftone image is disclosed which includes receiving primary image data, receiving desired Glossmark image data, and tagging at least some portion of the primary image data, as directed by the desired Glossmark image with a first tag setting. By selectively applying halftones with anisotropic structure characteristics, which are significantly different in orientation while remaining identical in density, as directed by tag settings, a Glossmark image may be superimposed within an image without the need for special toners or paper.

U.S. Pub. No. 20050128523, published Jun. 16, 2005, entitled REDUCTION OF DIFFERENTIAL GLOSS, by Chu-Heng Liu, et al., discloses a method for reduction of differential gloss as found in hardcopy image prints. The method includes selecting a first halftone having a high apparent gloss characteristic, selecting a second halftone having a low apparent gloss characteristic while retaining an identical matching density characteristic to the first selected halftone, applying the first halftone to at least some portion of the halftone image, and applying the second halftone to the remaining portion of the halftone image.

U.S. Pub. No. 20050128524 published Jun. 16, 2005, entitled ENHANCEMENT OF GLOSSMARK IMAGES AT LOW AND HIGH DENSITIES, by Chu-Heng Liu, et al., discloses a method for the manipulation of the differential gloss in a halftone image. The method includes selecting a first halftone having a first anisotropic structure orientation, selecting a second halftone having a second anisotropic structure orientation different from that of the first halftone, applying the first halftone to at least some portion of the halftone image, applying the second halftone to the remaining portion of the halftone image, and applying a clear toner to some portion of a hardcopy output of the resulting halftone image.

U.S. Pub. No. 20050286083, published Dec. 29, 2005, entitled GLOSSMARK IMAGES WITH CLEAR TONER, by Shen-Ge Wang, et al., relates to the creation of differential gloss images in clear toner by the manipulation of halftones employed prior to the depositing of the clear toner layer upon a substrate. By selectively applying halftones with anisotropic structure characteristics which are significantly different in orientation although remaining identical in density, a differential gloss image may be superimposed within even clear toner as applied to paper. Further, this technique may be used to enhance color toner Glossmark images across the low and high density areas of application where the differential gloss effect would otherwise be weak.

U.S. Pub. No. 20060044617, published Mar. 2, 2006, entitled REDUCTION OF DIFFERENTIAL GLOSS WITH HALFTONED CLEAR TONER, by Shen-Ge Wang, et al., discloses a method for reduction of differential gloss as found in halftone image hardcopy prints. The method includes selecting either a single halftone or employing two halftones: a first halftone having a high apparent gloss characteristic and a second halftone having a low apparent gloss characteristic. A determination is then made of which areas of the halftone image correspond to potentially high gloss and low gloss regions under normal printing conditions. An overlay of clear toner is applied to the hardcopy print of the halftone image.

U.S. Pub. No. 20060072159, published Apr. 6, 2006, entitled VARIABLE DATA DIFFERENTIAL GLOSS IMAGES, by Reiner Eschbach, et al., relates to the segmentation of an image into a main area and an image segment for variable data differential gloss image control. A method for variable data differential gloss image control includes selecting a single color, selecting a first halftone having a first anisotropic structure orientation, creating a first color definition comprising the single color and the first halftone, selecting a second halftone having a second anisotropic structure orientation different from that of the first halftone, creating a second color definition comprised of the single color and the second halftone, applying the first color definition to at least some portion of an image of interest, and applying the second color definition to the remaining portion of the image of interest to produce a variable data differential gloss image.

U.S. Pub. No. 20060127117, published Jun. 15, 2006, entitled USER INTERFACE FOR DIFFERENTIAL GLOSS IMAGES, by Reiner Eschbach, et al., discloses a user interface for the effective generation of differential gloss images. The user is instructed to indicate the base primary image data, and the desired differential gloss image data. This data may be displayed for verification and position adjustment by superimposition of the differential gloss image data upon the base image data. In an alternative, the placement information may be inferred from the position of originals upon the scanner or copier platen and the result may or may not be displayed. By selectively applying halftones with different anisotropic structure orientation characteristics to the base primary image data as directed by the desired differential gloss image data, a differential gloss image file or hardcopy may be provided.

BRIEF DESCRIPTION

In accordance with one aspect of the exemplary embodiment, a method for creating a differential gloss image includes providing first and second anisotropic halftone structures, the first and second anisotropic structures having different orientations. One of the first and second anisotropic structures is applied to image data in a first region of an image to be halftoned. The other of the first and second anisotropic structures is applied to image data in a second region of an image to be halftoned. A mixture of the first and second anisotropic structures is applied to image data in a third region of the image to be halftoned, whereby when printed, the first, second, and third regions each have a gloss characteristic which differs from that of the other two regions.

In accordance with another aspect, a printed item includes a substrate and a differential gloss image printed on the substrate. The differential gloss image includes a first region comprising a first anisotropic halftone structure, a second region comprising a second anisotropic halftone structure, different in orientation from the first anisotropic halftone structure, and a third region, abutting at least one of the first and second regions, comprising a mixture of the first anisotropic halftone structure and the second anisotropic halftone structure, whereby the third region has a gloss characteristic which differs from that of the first and second regions.

In another aspect, an apparatus for generating a differential gloss image includes a component which provides first and second anisotropic halftone structures, the first and second anisotropic structures having different orientations. A component selectively applies the first anisotropic halftone structure and the second anisotropic structure to image data in regions of an image to generate a differential gloss pattern. The component is configured for applying the first anisotropic halftone structure to image data in a first region of an image to be halftoned, for applying the second anisotropic halftone structure to image data in a second region of an image to be halftoned, and for applying a mixture of the first and second anisotropic structures to image data in a third region of the image to be halftoned, whereby when printed, the first, second, and third regions each have a gloss characteristic which differs from that of the other two regions.

In another aspect, a method for creating a differential gloss image includes providing first and second anisotropic halftone screens, the first and second anisotropic screens generating halftone structures having different orientations. One of the first and second screens is applied to image data in a first region of an image to be halftoned. Optionally, the other of the first and second screens is applied to image data in a second region of an image to be halftoned. A combination of the first and second screens is applied to image data in a third region of the image to be halftoned, whereby when printed, the first region, second region, where present, and third region each have a gloss characteristic which differs from that of the other region or regions.

BRIEF DESCRIPTION OF THE DRAWINGS

FIG. 6 illustrates a third Glossmark screen which is a combination of the first and second screens illustrated in FIG. 1;

DETAILED DESCRIPTION

Figure 1:
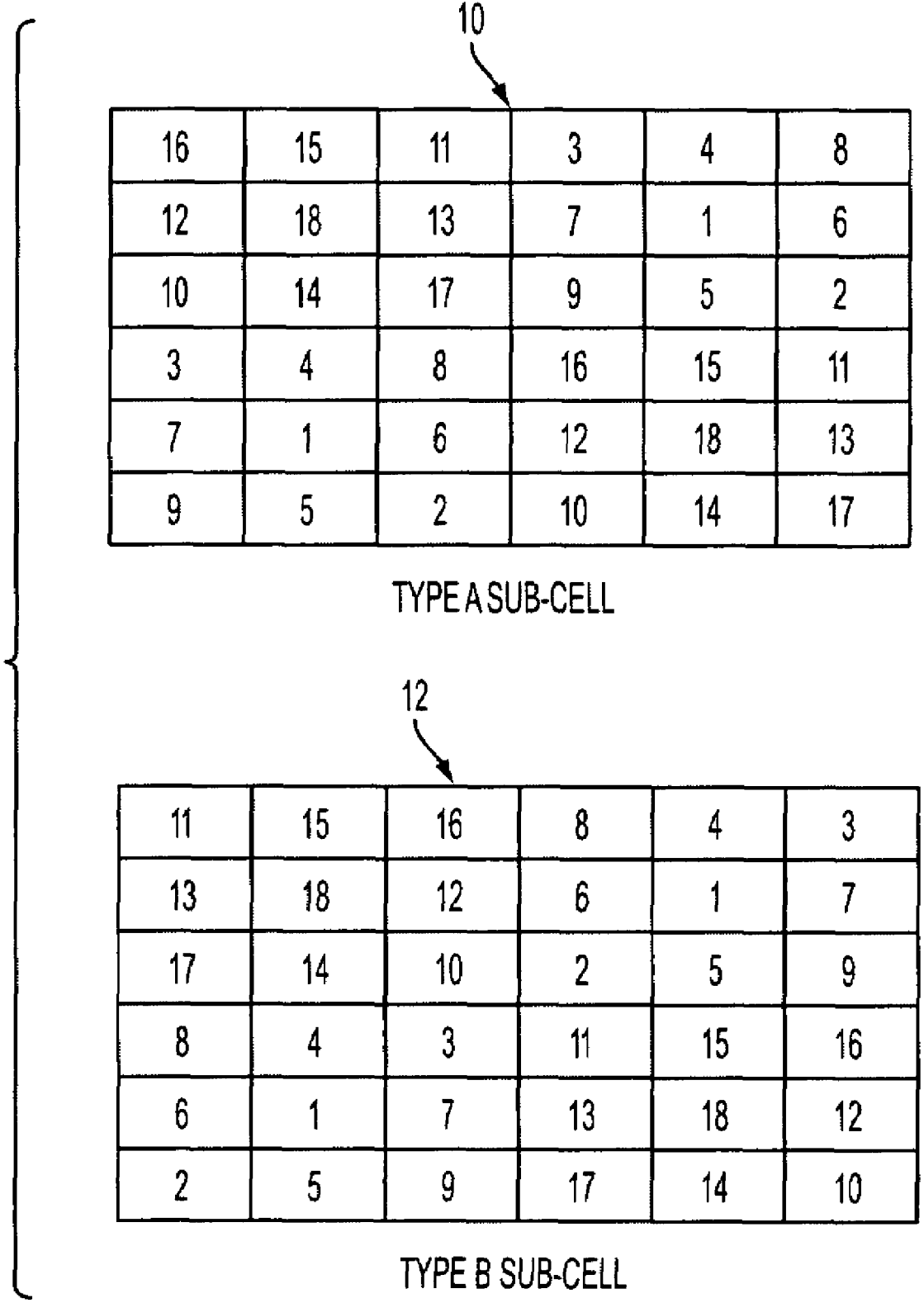
FIG. 1 shows two 6×6 halftone screens suitable in anisotropic structure to produce discernable gloss differentials for practicing the exemplary method.

The exemplary embodiment relates to a method and to an apparatus for creation of Glossmark™ patterns in digital image data. In various aspects, the method enables the generation of an image having three clearly distinguishable gloss characteristics. Two of the gloss characteristics may be provided by massing *anisotropic halftone structures of first and second polarization, respectively. A third of the gloss characteristics is formed by incorporating the first and second types of anisotropic halftone structure in the same region whereby the region has a gloss characteristic which is different from that which may be provided by the first or second anisotropic halftone structure if used alone.

In this way, an image may be created which includes a first region (or regions) which includes solely or predominantly anisotropic halftone structures of the first type having a first gloss characteristic, a second region (or regions) which includes solely or predominantly anisotropic halftone structures of the second type having a second gloss characteristic and a third region (or regions) which includes anisotropic halftone structures of the first and second types. In particular, the third region includes a greater proportion of the second type of anisotropic halftone structures than the first region and a greater proportion of the first type of anisotropic halftone structures than the second region, such as a substantially equal proportion of each type of halftone structure. The third region thus has a gloss characteristic, different from two gloss characteristics of the other two regions. The different gloss characteristics of the three regions can be used to introduce a watermark in the image. The different gloss characteristics may provide each of the three regions with a different gloss appearance, when viewed at a particular viewing angle.

While multi-level Glossmark images can be created with more than two gloss levels by employing three (or more) different halftone structures, it is difficult to make different halftone structures having an appearance of the same color and density, especially one which is consistent in time and space. For example, in order to create an N-level Glossmark image, N halftone screens can be designed for different gloss appearances. While these screens can be calibrated individually for an identical color appearance, any change in the machine characteristics may influence the color outputs of these screens differently.

In the exemplary system and method, a third halftone structure is created by mixing two halftone structures on a cluster-to-cluster basis. The result of the mixing generates a color output very close to the color output by the first and second halftone structure used alone, while providing a gloss appearance which is different from both the first and the second screen output. In general, the third gloss appearance is somewhere between the two distinguishable gloss appearances corresponding to the two different halftone structures, while the color and density of the third halftone structure are substantially the same as that of the matched two halftone structures.

The exemplary system and method allow differential gloss images with three (or more) distinct gloss characteristics to be created with only two screens. By using only two halftone structures which are mirror images of each other, the images formed from the two halftone structures and their mixture can maintain the same general image quality of two-level Glossmark embedding methods while providing the additional gloss appearance for creating more vivid Glossmark images.

Techniques for generating differential gloss patterns in printed images which may be utilized herein are described, for example, in above-mentioned U.S. Pat. Nos. 7,092,128, 7,126,721, and 7,148,999, and in Publication Nos. 20030231349, 20040000786, 20040114160, 20050128523, 20050128524, 20060072159, 20060127117, incorporated herein by reference. A digital image which has been halftoned includes binary image data, for one or more color channels. In the case of a monochrome image, the image data may be for a single color channel, such as a black channel. In the case of a color image, image data for up to four (or more) channels, such as cyan, magenta, yellow and optionally black channels may be provided.

In generating a differential gloss pattern, as used herein, a plurality of different screens may be used in forming a halftoned binary image. The screens may generate halftone structures with similar sizes and shapes but different polarization directions. By toggling between the halftone screens in generating the halftone image, differences in gloss are apparent when the rendered image is printed and viewed at an angle. The embedded differential gloss pattern created by this process may be a text, a logo, or another image. In the case of color printing, the same differential gloss pattern may be embedded into each of the color channels (CMYK), such that when rendered, the differential gloss patterns are substantially in superimposition one on top of the other in the printed image.

A printer, as used herein can include any device for rendering an image on print media, such as a printer, bookmaking machine, or a multifunction machine having copying and/or faxing as well as printing capability. Print media can be a usually flimsy physical sheet of paper, plastic, or other suitable physical print media substrate for images. An image generally may include information in electronic form which is to be rendered on the print media by the printer and may include text, graphics, pictures, and the like. The operation of applying images to print media, for example, graphics, text, photographs, etc., is generally referred to herein as printing. While in the exemplary embodiment, the printer is described in terms of a xerographic printer, it is also contemplated that the printer may incorporate inkjet or other marking technology.

A watermark can comprise any regular or irregular shaped region or combination of regions, each region having a different gloss characteristic from an abutting region of the image. Exemplary watermarks include indicia, logos, trademarks, bar codes, date/time stamps, monetary values, serial numbers, tracking numbers, program codes, and repeating patterns of visually discernable shapes, although the variety of watermarks is not limited to these types. In one embodiment, the three gloss levels are used to simulate a three dimensional structure, for example, by simulating the light reflecting characteristics of three, generally orthogonal, faces of a structure, such as a box, in perspective view.

The differential gloss images have a variety of applications including providing an indicia which serves as a security feature in a document, as described, for example, in U.S. Pat. No. 7,126,721, providing variable information, as described, for example, in U.S. Pat. No. 7,148,999, as a logo, a trademark, a bar code, a monetary value, a serial number, a program code, or as a decoration, such as for a greeting card, gift wrap, wallpaper, or the like. The printed substrate comprising the image may be a coupon, ticket, certificate, passport, award, banknote, diploma, decorative item, or other document. The differential gloss watermarks may be utilized, for example, to provide security information for a ticket, coupon, or the like, to provide indicia as to the source of the image, to provide personalized information in mass mailings, or to provide time varying information, such as a date on which the image is printed, or the like.

The halftone screens used in generating the differential gloss patterns have different anisotropic halftone structure orientations provided by differences in dot growth patterns. Typically, the halftone structures (clusters) generated by the screens have similar sizes and shapes (for a given gray level) but different polarization directions. In one embodiment, the anisotropic structures provided by the halftone screens are mirror images (for the same gray level).

When a printed halftone image with differential gloss patterns embedded by the exemplary method is illuminated and viewed at a normal angle, i.e., directly above the paper, the reflection and diffusion in the regions with different halftone structures are typically similar. In this way, the light which is available to a scanner or to the human eye from directly above is the same. However, the specular reflected light is considerably greater for one of the anisotropic orientations when the illumination is at a given off-normal angle. If as printed, a mass of the first orientation halftone structures are butted directly adjacent to a mass of the second orientation halftone structures, there will be a difference in reflected light between them, which when viewed from an angle will be perceived as a gloss differential. Similarly, if as printed, a mass of the first (or second) orientation halftone structures is butted up against a mass of halftone structures of mixed anisotropy, there will also be a difference in reflected light between them, which when viewed from an angle will be perceived as a gloss differential.

The perceptibility of this gloss differential is generally maximized when the halftone anisotropic orientations are 90 degrees apart. In practice, this is typically provided by screens at +45° and −45° from the printing process direction. It will be appreciated that the anisotropy is apparent at most intermediate gray levels where at least some but not all the pixels are turned on. At very high or low gray levels, where all or none of the pixels are turned on, the anisotropy is diminished or absent.

During the halftoning process, a halftone screen is applied repeatedly as it is tiled to fill the image area. The output of this process is a binary pattern of multiple dots, or clusters, that grow with an increasing gray level. In one embodiment, the dot growth may be as illustrated in FIG. 1, which shows the fill order in which pixels are switched on for exemplary 6×6 halftone screens type A, designated 10, and type B, designated 12. The growing dots are regularly spaced in a grid as determined by the tiled locations of the fill-order number 1 (i.e., the first pixel to be switched on) in the applied halftone screen. If either the exemplary screen A or the screen B is applied to a halftoning process, the binary output will be clusters aligned at +45° and −45° directions because of the tiling and the geometry of the screen. Separately, the fill orders in the halftone screens also define the shapes of growing dots at different gray levels. For example, at a level when only pixels aligned with screen fill-order number 3 or less are switched on in an application of the exemplary screen A, all dots have an anisotropic shape with three adjacent pixels lined at 45 degrees to the right; while in an application of screen type B all dots have a shape with a 45 degree to the left orientation. In the exemplary embodiment, the anisotropic orientations of the dot shape are independent of the multiple-dot alignment directions, or the screen angles, although both of them are determined by the design of the halftone screen and both of them are at 45 degrees. To maximize the perceptibility of the gloss differential, the anisotropic orientations of screen A and screen B are arranged at 90 degrees one from the other. However, the exemplary method is not limited to the screens shown and is suited to the creation of differential gloss images where the halftone structures of at least one of the color channels in an image exhibit at least some degree of anisotropy.

In another embodiment, the anisotropy may be provided by two orthogonally oriented line screens.

Figure 2:
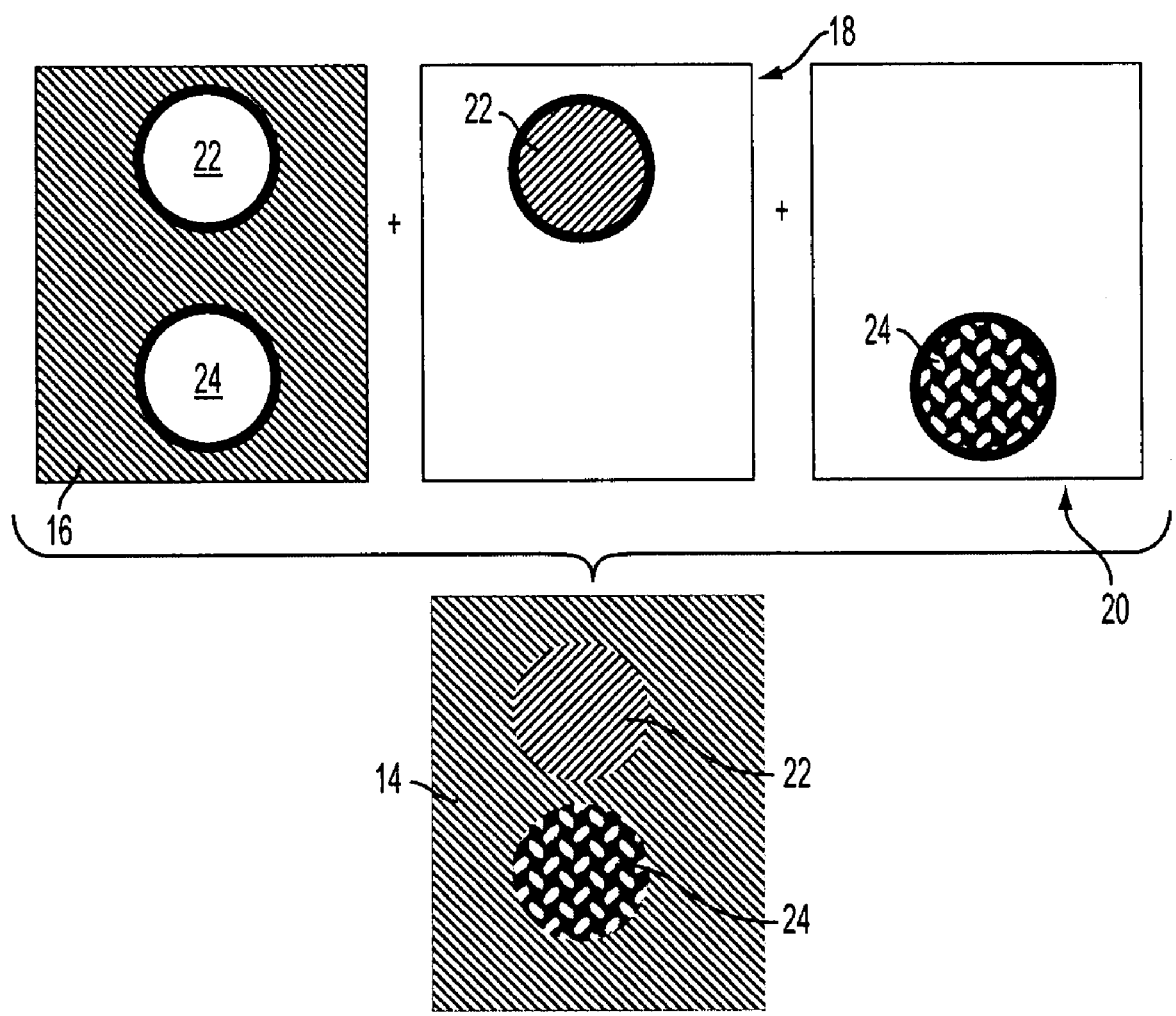
FIG. 2 depicts the formation of an image using two halftone patterns and their mixture to achieve three differential gloss levels.

FIG. 2 depicts the creation of a Glossmark image 14 achievable using halftone screens 10, 12 as described above. The image 14 is a patchwork formed by a combination of halftoned images 16, 18 and 20. A base (background) image 16 and first and second watermark images or masks 18, 20 are combined by screening the background image (or a first region) with a first of the screens, such as screen 10 except for second and third regions 22, 24 corresponding to differential gloss patterns or "watermarks," which are screened with a second of the halftone screens 12, and with a mixture of the first and second screens, respectively. The resulting image 14 is a patchwork of the halftones created by the two screens 10, 12. In the resulting image, the first region, or background region, has an anisotropic halftone structure defined by the exemplary halftone screen 10, the second region, or upper watermark 22 has an anisotropic halftone structure defined by the exemplary halftone screen 12, and the third region or lower watermark 24 has mixed anisotropic halftone structures defined by the two exemplary halftone screens. As will be appreciated, the background region can alternatively be formed with screen 12 or from mixed halftone structures by screens 10, 12, and, correspondingly, the watermark regions 22, 24, formed with the other two types.

Figure 3:
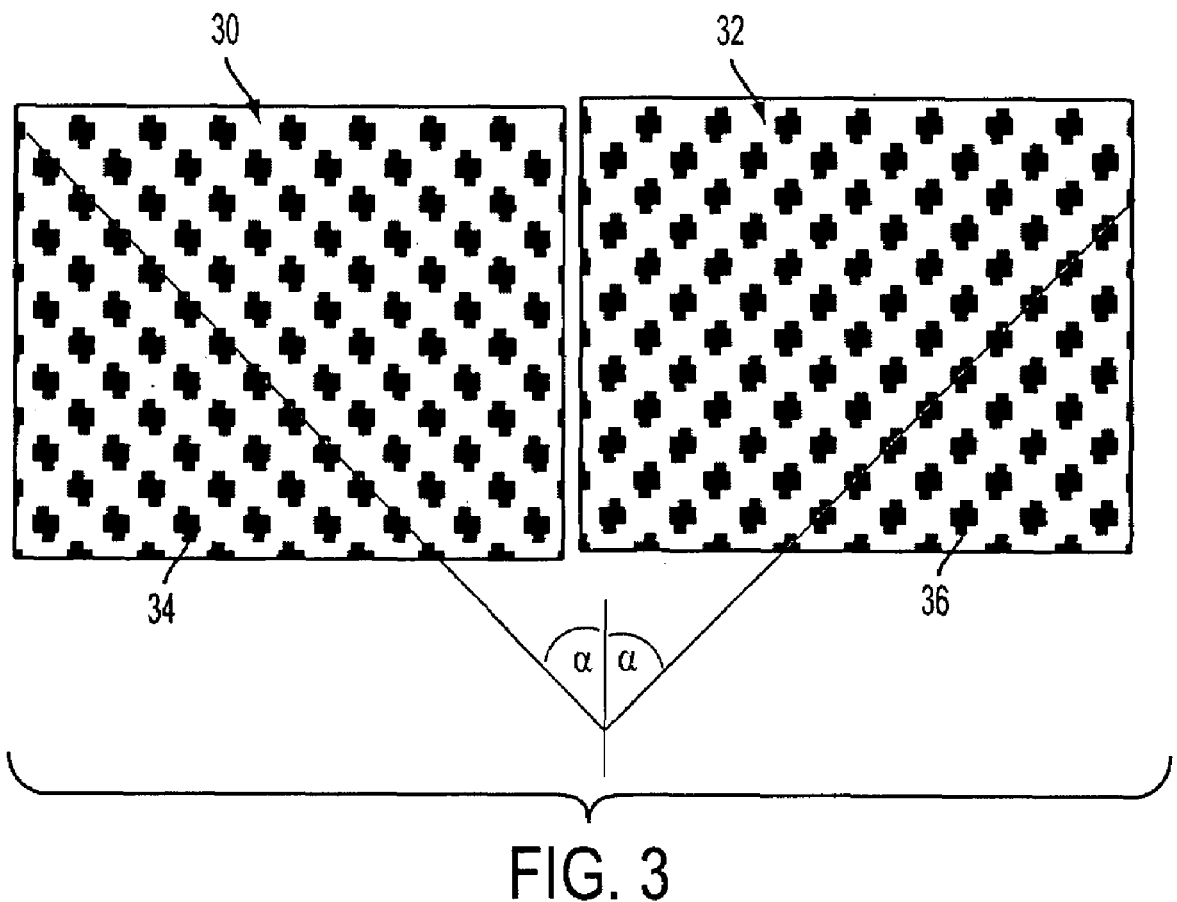
FIG. 3 illustrates two exemplary halftone structures defined by the two conjugate Glossmark screens of FIG. 1.

In one embodiment, Glossmark digital watermarks in three clearly distinguishable gloss-levels are generated using the same two halftone screens, which generate outputs in two oppositely polarized shapes, the third level shown as a mixed pattern of the two shapes. FIG. 3 illustrates patterns 30, 32 which may be generated by using a selected one of the exemplary halftone structures (at a particular gray level). Pattern 30 comprises a mass of halftone structures 34 generated by screen A while pattern 32 comprises a mass of halftone structures 36 generated by screen B. As will be appreciated, as the gray level changes, the size and shape of the structures changes, while substantially maintaining the anisotropic characteristic. The lines drawn through the centers of the halftone structures (clusters) indicate the angles of the two screens. Here the two screens are arranged at angle a to the printing process direction.

Figure 4:
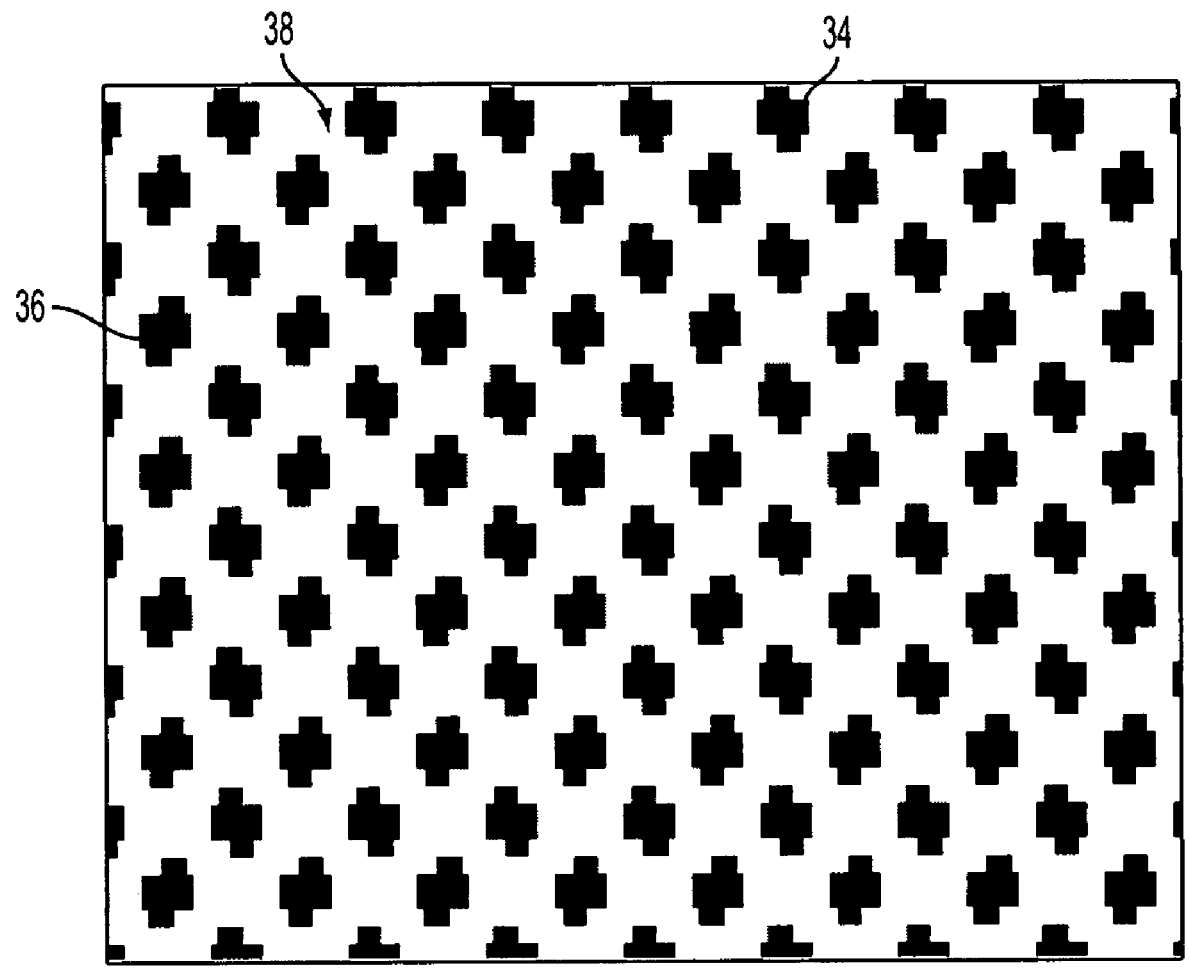
FIG. 4 illustrates a pattern achieved by mixing the halftone structures of FIG. 3.

FIG. 4 illustrates a pattern 38 created by a mixture of the two anisotropic halftone structures 34, 36. The density/color appearance of the halftone mixture is very close to the two anisotropic halftone structures. In one embodiment, the distribution of each of the halftone structures is periodic, with each structure having its own frequency of appearance in the two screen angle directions. This provides a substantially uniform distribution of the two halftone structures throughout the region 24. The region 24, corresponding to the third gloss level, can be specified by alternated first and second screens, e.g., on a cluster-to-cluster basis.

While FIG. 4 shows a regular pattern of halftones alternating in their polarization such that the region-24 comprises substantially equal numbers of the two halftone structures 34, 36, other regular patterns of halftone structures may be provided where each of the halftone structures is substantially uniformly distributed in the mixture. For example, a pattern in which two of the first halftone structures are followed by one of the second type of halftone structure is envisaged. It is also contemplated that a more random arrangement of the halftone structures may be provided in the mixture while retaining a substantially uniform distribution.

It should be noted that if the two halftone structures are not substantially uniformly distributed in the mixture, the region which is formed from the two halftone structures may not have a uniform gloss which is clearly differentiable from that of abutting regions. In this respect, a pattern of alternating first and second anisotropic structures on a cluster-to-cluster basis (in the direction of the screen angles) generally provides the greatest differential in gloss between the mixed region and abutting regions comprising a single halftone structure. In general, to provide even gloss in a region of mixed halftone structures, no two clusters of the same type of halftone structure are consecutively aligned in either direction of the screen angles. However, it is also contemplated that other periodic arrangements may be used in which, for example, two consecutive structures of the first screen type 10 are followed by two consecutive structures of the second screen type 12, in the direction of the screen angles. It is also contemplated that the two halftone structures may be combined in other than a 1:1 mixture, such as in a ratio of from about 1:2 to 2:1.

Figure 5:
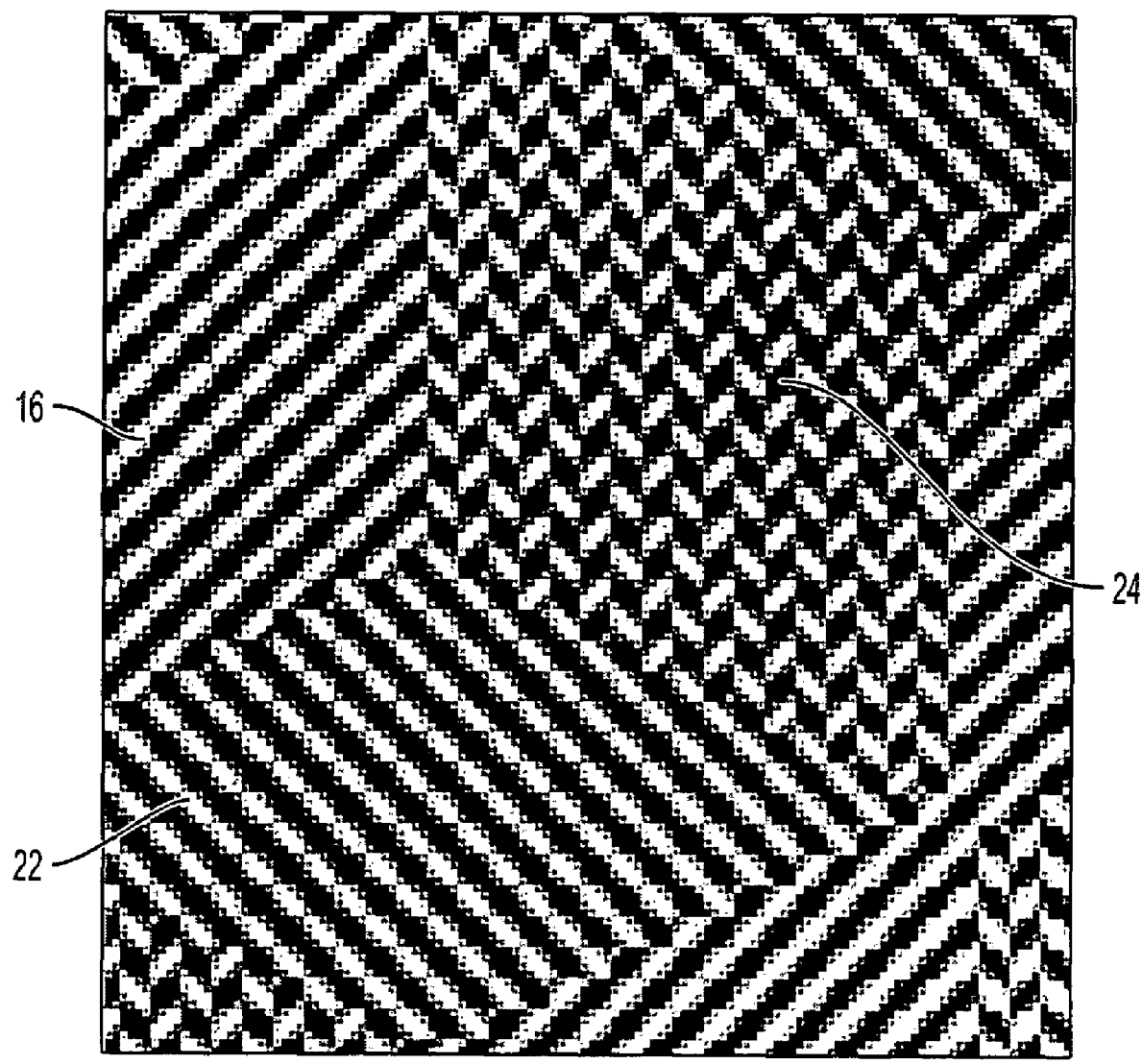
FIG. 5 illustrates a greatly enlarged view of an image rendered with patterns of the halftone structures of FIGS. 3,4.

FIG. 5 illustrates a magnified image in which the patterns created when regions 16, 22, 24 of the anisotropic halftone structures are abutted. As will be apparent, the regions formed from single halftone structures of the first type appear under magnification as colored lines angled in a first direction while the regions formed from single halftone structures of the second type appear under magnification as colored lines angled in a second direction. The regions of mixed gloss have a herringbone pattern, with no colored lines extending fully across the region. The three regions have a substantially identical color/density and gloss appearance at certain viewing angles but a watermark becomes visible under certain angles of illumination, i.e.: the original, base image is not disturbed in normal viewing, but the intended Glossmark image can be made visible when tilting the image in the light.

In order to create the exemplary Glossmark™ images, a base image file and one or more watermark image or mask files are generally employed. The base image file is the "normal" image that is seen when casually looking at the print. It serves as the background over which the intended watermark image is located. This image can be created in or be the result of any appropriate image manipulation application, such as for example Adobe PhotoShop™. This image forms the base for the Glossmark™ image and should have a sufficient image area in the mid-tones so that the desired differential gloss image will be visible. The base image file may be of a continuous tone or contone nature. One or more second files include the intended or desired watermark image(s). This file or files encapsulates the actual differential gloss image that is to be placed over the base image and thus is intended to be visible as a differential gloss image in the hardcopy output. In the case of a single file, the image may of a ternary image data type, meaning that only three different pixel values are allowed, such as 0, 1, and 2, corresponding to the first, second, and third (mixed) halftone structures. For those regions where the third halftone structure is selected, the multiplexer may be programmed to alternate automatically between the first and second halftone structures. Where two second files are used, each second file may be of a binary image data type, meaning that only "black" and "white", or "zero" and "one" pixel values are allowed. This can be achieved, for example, by using "Image→Mode→Bitmap" commands in PhotoShop™ or by any other image manipulation software using the appropriate commands to create a binary representation. The desired differential gloss image file(s) may also have their resolution adjusted to match up with the base image data if so needed In another embodiment, in order to provide a region of mixed halftone structures, a third screen is created which combines the halftone structures of the first and second screens. For example, as shown in FIG. 6, a screen 58 which is a combination of the first and second screens is used for halftoning the regions of intermediate gloss. For example, screen 58 includes two left quadrants from screen A and two right quadrants from screen B. The combined screen 58, for all practical purposes, functions analogously to toggling between the two screens and thus does not result in color or density variations which normally results from using a third screen.

As will be appreciated, other file formats for incorporating the two gloss levels may be provided. For example, the differential gloss information may be provided as a single file which identifies for each region, or sub-region, which screen is to be employed.

Figure 7:
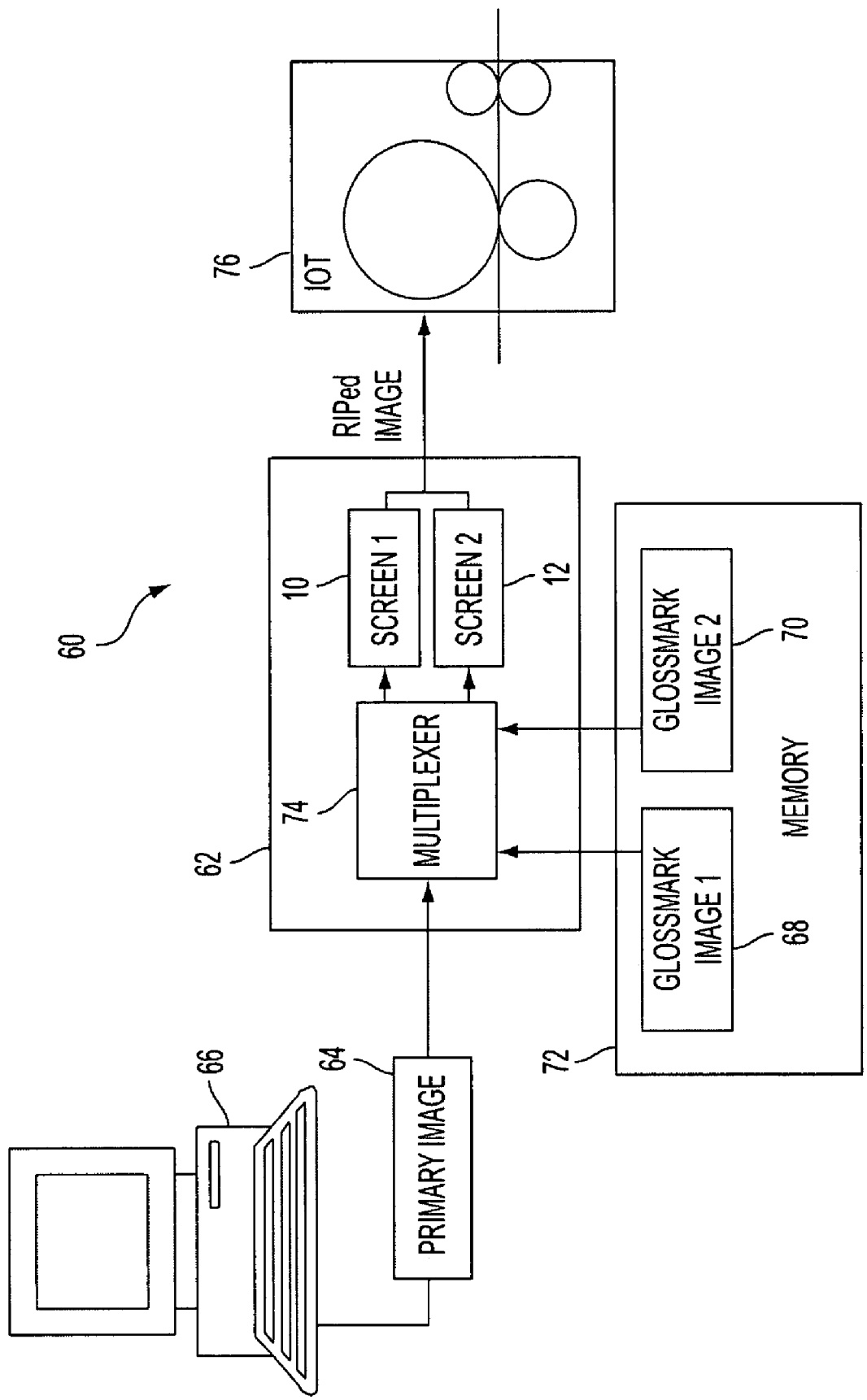
FIG. 7 is a functional block diagram of an exemplary apparatus for creation of images comprising multiple gloss levels.

An exemplary apparatus for the generation of a differential gloss image is shown in FIG. 7. The illustrated apparatus is embodied in a printer 60, although it will be appreciated that the differential gloss image may be generated at a location remote from the printer, such as in a workstation in communication therewith. The illustrated printer 60 includes a processor generally referred to as a digital front end (DFE) 62 which includes a variety of processing components. A primary image 64 may be received as input data to the digital front-end (DFE) 62 as is normal. For example, the image may be transferred from a remote workstation 66 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge. The primary image data may include image data for one or more color channels, e.g., in a portable document format.

One or more desired Glossmark images 68, 70 are also received as input data to the DFE 62. In one embodiment, the Glossmark images do not include color data but merely identify those regions which are to be halftoned with a different screen or screens. Alternatively, a single Glossmark image 68 may identify each region of the image which is to be of a different gloss and assign to each of those regions a halftone structure, and/or screen(s) to be used. In one embodiment, the Glossmark image or images 68, 70 are stored in printer memory 72. In another embodiment, the Glossmark image(s) are generated, at least in part, by a processing component associated with the printer (e.g., in the case of a variable Glossmark, such as a time/date stamp). Alternatively, the Glossmark image(s) 68, 70 may be received in a file along with the incoming primary image data. In generating a halftone image, an applying component, which in the exemplary embodiment comprises a multiplexer switch 74, selectively actuates the first and second screens 10, 12 according to the region of the image as designated by the image data 64, 68, 70. The processed image is sent to an image output terminal (IOT) 76 as a binary image produced by halftoning the primary image data 64 as is normal. However, the halftone type selection is driven by the intended Glossmark image data 68, 70 as input to multiplexer switch 74. The intended Glossmark image data 68, 70 for example, may serve to direct a portion of the primary image 64 to use a first anisotropic structured halftone while directing an alternative halftone to be used for a second portion and a mixture of the two halftones for the remainder of primary image 66.

As will be understood by those skilled in the art, the intended Glossmark image data 64, 68, 70 may be flattened into simple zero and one pixel data representations if needed in the DFE 62. This pattern of zero and ones are then used to toggle the multiplexer 74 to one halftone anisotropic structure orientation type or the other. Multiplexer 74 therefore toggles between screen type A halftone and screen type B halftone, as dictated by the desired Glossmark data 68, 70, to produce the composite result of raster input processed (RIP) image data as passed to the IOT 76. In this way, a superimposition of differential gloss patterns are embedded into the primary image 64 which can only be perceived as gloss differential Glossmark.

In one embodiment, the halftoned image data thus formed may be stored as a digital image data file to be rendered by the same or a different printer or device from the device creating the digital image file. For example, the image data file may be stored for later rendering on a printer which does not have software and/or hardware for creation of differential gloss images.

The image output terminal 76 may include a marking engine for rendering the halftoned image on a tangible substrate such as print media. As known in the art, such devices include the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which may include a cleaning device, a charging station for each of the colors to be applied (one in the case of a monochrome printer, four in the case of a CMYK printer), such as a charging corotron, an exposure station, which forms a latent image on the photoreceptor, a developer unit, associated with each charging station for developing the latent image formed on the surface of the photoreceptor by applying a toner to obtain a toner image, a transferring unit, such as a transfer corotron, which transfers the toner image thus formed to the surface of the print media substrate, and a fuser, which fuses the image to the sheet. The fuser generally applies at least one of heat and pressure to the sheet to physically attach the toner and optionally to provide gloss to the printed media.

While particular reference is made to electrophotographic (e.g., xerographic) printers, suitable marking engines may also include ink-jet printers, including solid ink printers, thermal head printers that are used in conjunction with heat sensitive paper, and other devices capable of marking an image on a substrate. It is to be appreciated that the marking engine can include an input/output interface, a memory, a marking cartridge platform, a marking driver, a function switch, a controller and a self-diagnostic unit, all of which can be interconnected by a data/control bus.

Figure 8:
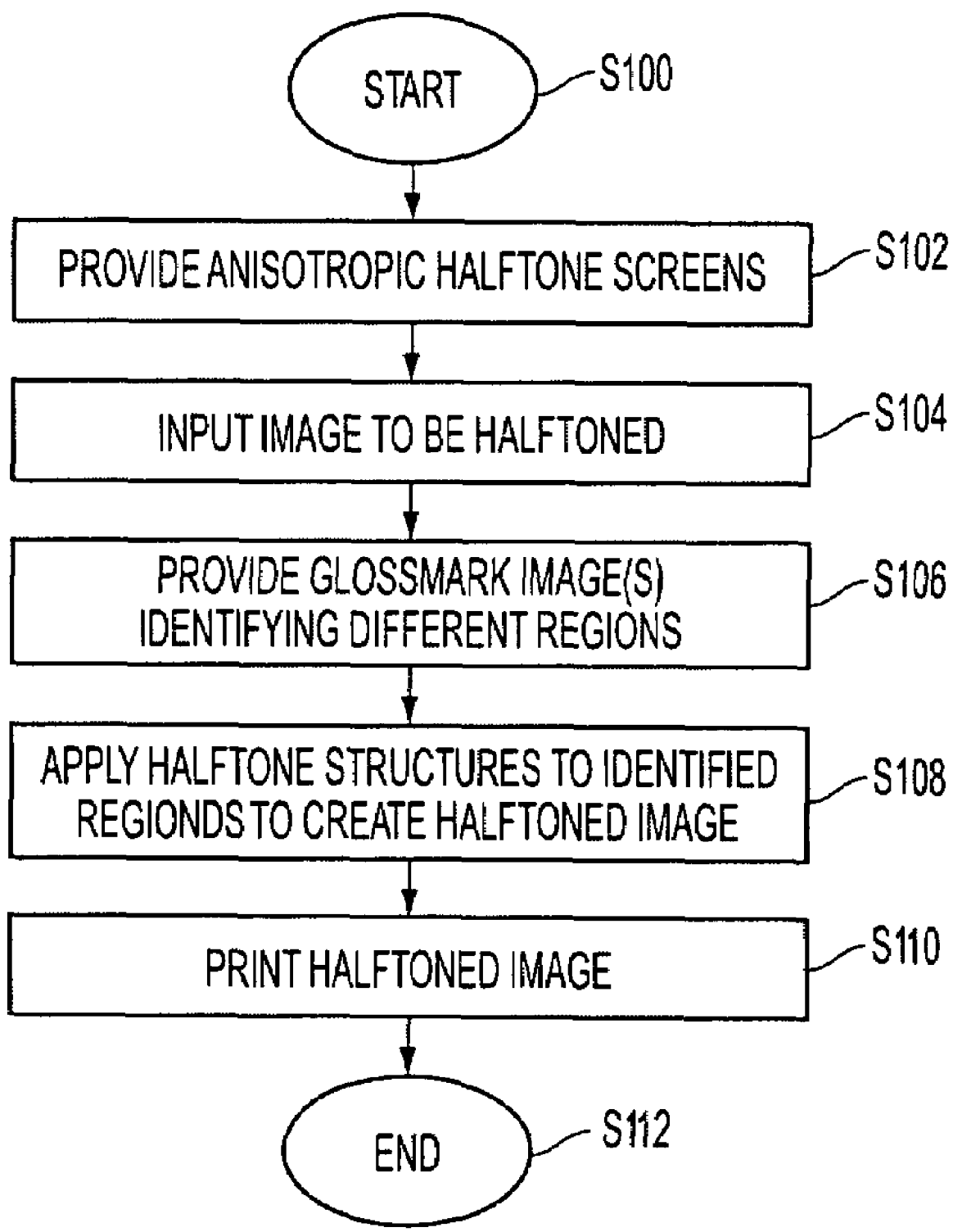
FIG. 8 illustrates an exemplary method of forming a differential gloss image.

FIG. 8 illustrates an exemplary method for creating a differential gloss image. It should be appreciated that the method may include fewer, more or different steps and that the steps of the exemplary method need not be performed in the order shown. The method begins at step S100. At step S102 first and second anisotropic halftone structures are provided, e.g., from memory 72, the first and second anisotropic structures having different orientations. At step S104, an input image to be halftoned is received. At step S106, regions of the image to be halftoned with halftone structures are identified, for example, by providing a file or files comprising a Glossmark image to be generated. At step S108, the halftone structures are applied to the identified regions, which may comprise applying a first of the anisotropic structures to image data in a first of the identified regions, applying a second of the anisotropic structures to image data in a second of the identified regions, and a combination of the anisotropic structures to image data in a third of the identified regions. At the end of step S108, the entire image is halftoned with the halftone structures. At step S110, the halftoned image is printed on a print media substrate. In the printed image, each of the first, second, and third regions has a gloss characteristic which differs from that of the others of the first, second, and third regions. As will be appreciated, multiple first, second, and/or third regions may be formed in the creation of a differential gloss image. The method ends at step S112. The computer implemented steps of the method illustrated in FIG. 8 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for creating a differential gloss image comprising:
    providing first and second anisotropic halftone structures, the first and second anisotropic structures having different orientations;
    applying one of the first and second anisotropic structures to image data in a first region of an image to be halftoned with a first halftone screen;
    applying the other of the first and second anisotropic structures to image data in a second region of an image to be halftoned with a second halftone screen;
    applying a mixture of the first and second anisotropic structures to image data in a third region of the image to be halftoned with the first and second halftone screens; and
    with a printer, printing the halftoned image comprising the first second and third regions on a print media substrate, whereby on the printed substrate, the first, second, and third regions each have a gloss characteristic which differs from that of the other two regions.

2. The method of claim 1, wherein to each region, a mass of halftone structures is applied, the third region comprising a mass of mixture of the first and second anisotropic structures.

3. The method of claim 1, wherein the applying of the mixture of the first and second anisotropic structures to image data in the third region comprises alternating first and second halftone structures in the third region.

4. The method of claim 1, wherein the applying of the mixture of the first and second anisotropic structures to image data in the third region comprises applying a substantially uniform distribution of each of the first and second halftone structures in the third region.

5. The method of claim 4, wherein the applying of the mixture of the first and second anisotropic structures to image data in the third region comprises applying a mask which designates the first and second halftone structures to alternating sub-regions of the third region.

6. The method of claim 1, wherein at least one of the first, second, and third regions comprises a watermark which is visually detectable in the image, when printed.

7. The method of claim 6, wherein the watermark comprises at least one of an indicia, a logo, a trademark, a bar code, a date/time stamp, a monetary value, a serial number, a tracking number, a program code, and a repeating pattern of visually discernable shapes.

8. The method of claim 1, wherein the first anisotropic structure orientation and the second anisotropic structure orientation are 90 degrees apart.

9. The method of claim 8, wherein the first anisotropic structure has a 45 degree orientation to a process direction of the image and the second anisotropic structure has a 45 degree orientation to the process direction of the image.

10. The method of claim 1, wherein the different gloss characteristics provide each of the three regions with a different gloss appearance, when viewed at a particular viewing angle.

11. A method for creating a differential gloss image comprising:
    providing first and second anisotropic halftone structures, the first and second anisotropic structures having different orientations;
    applying one of the first and second anisotropic structures to image data in a first region of an image to be halftoned with a first halftone screen;
    applying the other of the first and second anisotropic structures to image data in a second region of an image to be halftoned with a second halftone screen;
    applying a mixture of the first and second anisotropic structures to the image data in a third region of the image to be halftoned comprising at least one of:
        toggling between the first screen and the second screen for the image data in a third region; and
        applying a third screen which functions as a combination of the first and second screens, the third screen generating the first and second anisotropic halftone structures; and
    with a printer, printing the halftoned image comprising the first second and third regions on a print media substrate, whereby on the printed print media substrate, the first, second, and third regions each have a gloss characteristic which differs from that of the other two regions.

12. The method of claim 11, wherein the applying a mixture of the first and second anisotropic structures to the image data in a third region of the image to be halftoned comprises toggling between the first screen and the second screen.

13. A printed item comprising:
    a substrate; and
    a differential gloss image printed on the substrate, the differential gloss image comprising a first region comprising a first anisotropic halftone structure, a second region comprising a second anisotropic halftone structure, different in orientation from the first anisotropic halftone structure, and a third region, abutting at least one of the first and second regions, comprising a mixture of the first anisotropic halftone structure and the second anisotropic halftone structure, whereby the third region has a gloss characteristic which differs from that of the first and second regions, wherein the different gloss characteristics provide each of the three regions with a different gloss appearance, when viewed at a particular viewing angle.

14. The printed item of claim 13, wherein two of the first, second, and third regions comprise a watermark.

15. The printed item of claim 14, wherein the watermark depicts at least one of an indicia, a logo, a trademark, a bar code, a date/time stamp, a monetary value, a serial number, a tracking number, a program code, and a repeating pattern of visually discernable shapes.

16. The printed item of claim 13, wherein the item comprises at least one of a coupon, a ticket, a certificate, a banknote, a passport, an award, a diploma, and a decorative item.

17. The printed item of claim 13, wherein the printed image includes more than three regions including at least one of:
    a plurality of the first regions;
    a plurality of the second regions; and
    a plurality of the third regions.

18. An apparatus for generating a differential gloss image comprising:
- a component which provides first and second anisotropic halftone structures, the first and second anisotropic structures having different orientations; and
- a component which selectively applies the first anisotropic halftone structure and the second anisotropic structure to image data in regions of an image to generate a differential gloss pattern, the component configured for applying the first anisotropic halftone structure to image data in a first region of an image to be halftoned, for applying the second anisotropic halftone structure to image data in a second region of an image to be halftoned, and for applying a mixture of the first and second anisotropic structures to image data in a third region of the image to be halftoned, whereby when printed, the first, second, and third regions each have a gloss characteristic which differs from that of the other two regions.

19. The apparatus of claim 18, further comprising an image output terminal which prints the differential gloss image.

20. A method for creating a differential gloss image comprising:
- providing first and second anisotropic halftone screens, the first and second anisotropic screens generating halftone structures having different orientations;
- applying one of the first and second screens to image data in a first region of an image to be halftoned;
- applying a combination of the first and second screens to image data in a second region of the image to be halftoned;
- applying the other of the first and second screens to image data in a third region of an image to be halftoned, and
- with a printer, printing the image, whereby when printed, the first region, second region, and third region each have a gloss characteristic which differs from that of the other two regions.

21. A non-transitory computer program product comprising a tangible computer-readable recording medium on which a control program is recorded, which, when executed on a computer, perform a method comprising:
- providing first and second anisotropic halftone structures, the first and second anisotropic structures having different orientations;
- applying one of the first and second anisotropic structures to image data in a first region of an image to be halftoned;
- applying the other of the first and second anisotropic structures to image data in a second region of an image to be halftoned; and
- applying a mixture of the first and second anisotropic structures to image data in a third region of the image to be halftoned, whereby when printed, the first, second, and third regions each have a gloss characteristic which differs from that of the other two regions.

* * * * *